(No Model.)

J. DAILY.
BENCH STOP.

No. 531,102. Patented Dec. 18, 1894.

WITNESSES:
Fred G. Dieterich
P. B. Turpin.

INVENTOR
Josiah Daily.
BY Munn & Co
ATTORNEYS.

THE NORRIS PETERS CO., PHOTO-LITHO., WASHINGTON, D. C.

UNITED STATES PATENT OFFICE.

JOSIAH DAILY, OF NORTH PEORIA, ILLINOIS.

BENCH-STOP.

SPECIFICATION forming part of Letters Patent No. 531,102, dated December 18, 1894.

Application filed July 23, 1894. Serial No. 518,341. (No model.)

*To all whom it may concern:*

Be it known that I, JOSIAH DAILY, of North Peoria, in the county of Peoria and State of Illinois, have invented a new and useful Improvement in Bench-Stops, of which the following is a specification.

My invention is an improved bench stop or as I may more accurately describe it, it is a combined bench stop, square and marker, and the invention consists in the novel constructions, combinations and arrangements of parts as will be hereinafter described and pointed out in the claim.

Figure 1:
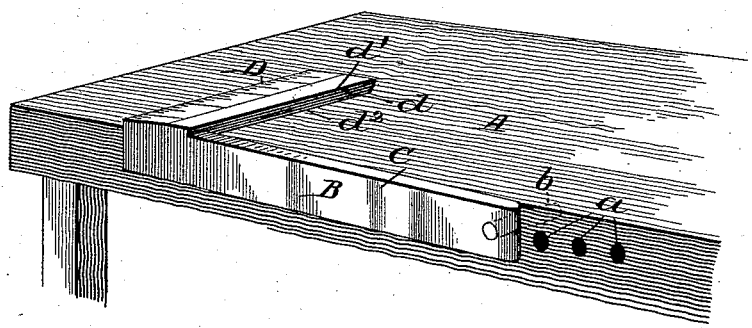
Figure 2:
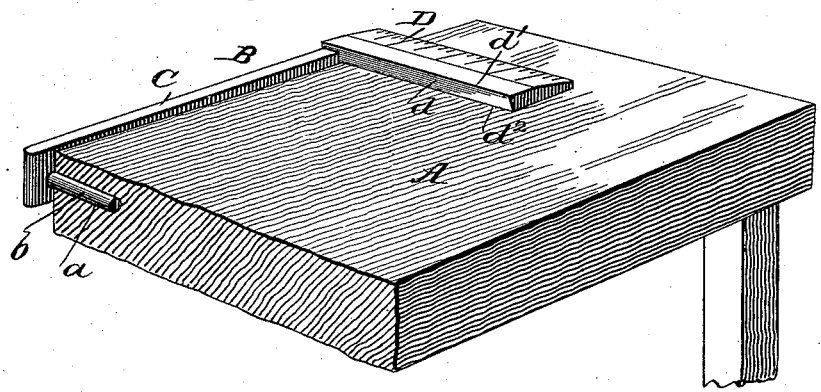
Figure 3:
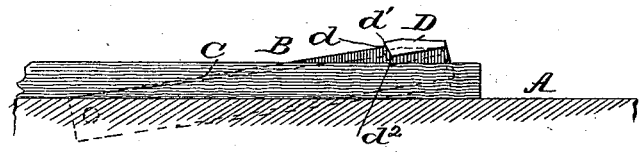

In the drawings—Figures 1 and 2 are perspective views of my dog, in position on a bench and Fig. 3 is a side view of the invention as in use.

The bench A of which a portion only is shown may be of any suitable construction, and is provided preferably along both edges near its top with sockets $a$ for the stud $b$ of the stop B. This stop B is formed with a side arm or shank C and a cross or head bar D arranged at a right angle to the shank C and is preferably arranged with its under side below the upper edge of that portion of the shank immediately next to the cross or head bar D so the shank C will form a side guide or abutment for the board or other timber applied to the stop and also form one arm of the square in using the device as a square or marker.

The side $d$ of the head bar is slightly undercut so its upper edge at $d'$ will afford a comparatively sharp edge to bind in the end of the timber stopped against while the lower edge $d^2$ of said stop may serve as a marker in squaring off boards. While a pencil, scriber, or scratch-awl may be used to mark off the square cross cut such markers are not always at hand and to avoid the difficulty resulting from their being mislaid I construct the stop so it may make the cross cut mark. This is effected by the lower edge $d^2$ which is made comparatively sharp and when struck upon the board leaves a clear distinct mark. This mark may be made by striking the cross head down upon the board or by placing said head upon the board and striking it a sharp blow with a hammer or mallet. This cross head it will be seen is made sufficiently long to make a line entirely across a narrow board or sufficiently far across a wider board to produce a substantial mark of suitable length to form a mark to serve as a guide in cutting across said board. When the cross head is lifted and the board slipped thereunder the shank C forms one arm and the cross bar another arm of the square. It is preferred to provide the cross head with graduations so it may serve as a rule or measure.

The stud $b$ may be removed from one of the sockets $a$ and inserted in any other one on either side of the bench to bring the stop to the desired point.

By my improvement it will be seen I provide a bench stop, and a try-square in one as well as measure and a marker.

Having thus described my invention, what I claim as new, and desire to secure by Letters Patent, is—

The combination substantially as herein described of the bench having a series of sockets the stop composed of a shank having at one end a stud fitted to said sockets and easily detachable whereby it may be changed from place to place the cross piece or head extended at right angles from the said shank and having the lower edge of its stop side formed with an edge by which to mark the board or other timber, the upper edge of the shank next to the said cross piece being extended or projected above the under side of said cross piece all substantially as and for the purposes set forth.

JOSIAH DAILY.

Witnesses:
JOHN L. SHORE,
DAVID S. SNIDER.